(12) United States Patent
Nguyen et al.

(10) Patent No.: US 11,584,021 B2
(45) Date of Patent: Feb. 21, 2023

(54) FABRIC-REINFORCED TEXTILE ACTUATORS

(71) Applicants: Pham Nguyen, Mesa, AZ (US); Wenlong Zhang, Mesa, AZ (US); Panagiotis Polygerinos, Gilbert, AZ (US); Francisco Lopez Arellano, Phoenix, AZ (US)

(72) Inventors: Pham Nguyen, Mesa, AZ (US); Wenlong Zhang, Mesa, AZ (US); Panagiotis Polygerinos, Gilbert, AZ (US); Francisco Lopez Arellano, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 343 days.

(21) Appl. No.: 16/875,047

(22) Filed: May 15, 2020

(65) Prior Publication Data
US 2020/0361095 A1 Nov. 19, 2020

Related U.S. Application Data

(60) Provisional application No. 62/849,506, filed on May 17, 2019.

(51) Int. Cl.
*B25J 15/00* (2006.01)
*B25J 15/02* (2006.01)
(Continued)

(52) U.S. Cl.
CPC ............. *B25J 15/0009* (2013.01); *B25J 9/14* (2013.01); *B25J 15/024* (2013.01); *B25J 15/12* (2013.01);
(Continued)

(58) Field of Classification Search
CPC ...... B25J 15/0009; B25J 15/024; B25J 15/12; B25J 15/0023; B25J 9/14; D06M 15/564;
(Continued)

(56) References Cited

U.S. PATENT DOCUMENTS 10,189,168 B2 * 1/2019 Lessing ............... B25J 15/0071
10,518,423 B2 * 12/2019 Curhan ................ F16B 35/06
(Continued)

FOREIGN PATENT DOCUMENTS

DE 102016125271 A1 * 6/2018
WO WO-2017120314 A1 * 7/2017 ........... A61B 17/135

OTHER PUBLICATIONS

Cappello et al., "Exploiting Textile Mechanical Anisotropy for Fabric-Based Pneumatic Actuators," Soft Robotics, 2018, 5(5)1662-674.
(Continued)

*Primary Examiner* — Stephen A Vu
(74) *Attorney, Agent, or Firm* — Michael Best & Friedrich LLP

(57) ABSTRACT

A soft robot hand includes a palm, a first fabric-reinforced textile actuator coupled to the palm, and a second fabric-reinforced textile actuator coupled to the palm. The first actuator is moveable relative to the palm between a collapsed position and an inflated position to approximate a joint in a first human finger. The second actuator is spaced apart from the first actuator. The second actuator is moveable relative to the palm between a collapsed position and an inflated position to approximate a joint in a second human finger.

17 Claims, 10 Drawing Sheets

(51) Int. Cl.
    *B25J 9/14*           (2006.01)
    *D06M 15/564*     (2006.01)
    *B25J 15/12*       (2006.01)
    *D06M 101/34*     (2006.01)

(52) U.S. Cl.
    CPC ...... *D06M 15/564* (2013.01); *D06M 2101/34* (2013.01)

(58) Field of Classification Search
    CPC .............. D06M 2101/34; D06M 17/10; B32B 2255/26; B32B 2255/02; B32B 2262/0261; B32B 1/00; B32B 3/08; B32B 5/026; B32B 27/12; B32B 27/40; B32B 7/09; D06N 3/14
    See application file for complete search history.

(56) References Cited

U.S. PATENT DOCUMENTS

| | | | |
|---|---|---|---|
| 2016/0075036 A1* | 3/2016 | Lessing | B25J 15/04 294/119.3 |
| 2016/0114482 A1* | 4/2016 | Lessing | B25J 15/083 294/196 |
| 2019/0015233 A1 | 1/2019 | Galloway et al. | |
| 2019/0024679 A1 | 1/2019 | Galloway | |
| 2019/0143517 A1 | 5/2019 | Yang et al. | |
| 2020/0093438 A1 | 3/2020 | Zhang et al. | |
| 2020/0094290 A1 | 3/2020 | Polygerinos et al. | |
| 2020/0102043 A1 | 4/2020 | Zhang et al. | |

OTHER PUBLICATIONS

F. Connolly, C. J. Walsh, and K. Bertoldi. Automatic design of fiberreinforced soft actuators for trajectory matching. Proceedings of the National Academy of Sciences, 114(1):51-56, 2017.

Nguyen et al., "Design, Characterization, and Mechanical Programming of Fabric-Reinforced Textile Actuators for a Soft Robotic Hand", 2019 IEEE/RSJ International Conference on Intelligent Robots and Systems (IROS), Nov. 2019.

P. Polygerinos, N. Correll, S. A. Morin, B. Mosadegh, C. D. Onal, K. Petersen, M. Cianchetti, M. T. Tolley, and R. F. Shepherd. Soft Robotics: Review of Fluid-Driven Intrinsically Soft Devices; Manufacturing, Sensing, Control, and Applications in Human-Robot Interaction. Advanced Engineering Materials, 19(12):1700016,2017.

D. Rus and M. T. Tolley. Design, fabrication and control of soft robots. Nature, 521(7553):467-475, 2015.

C. Laschi, B. Mazzolai, and M. Cianchetti. Soft robotics: Technologies and systems pushing the boundaries of robot abilities. Science Robotics, 1(1), 2016.

A. D. Marchese, R. K. Katzschmann, and D. Rus. A recipe for soft fluidic elastomer robots. Soft Robotics, 2(1):7-25, 2015. PMID: 27625913.

U.S. Appl. No. 17/180,757, filed Feb. 21, 2020, Schaller et al.

P. Polygerinos, Z. Wang, J. T. B. Overvelde, K. C. Galloway, R. J. Wood, K. Bertoldi, and C. J. Walsh. Modeling of Soft Fiber-Reinforced Bending Actuators. IEEE Transactions on Robotics, 31(3):778-789, 2015.

K. Suzumori, S. Iikura, and H. Tanaka. Development of flexible microactuator and its applications to robotic mechanisms. In Proceedings. 1991 IEEE International Conference on Robotics and Automation, No. April, pp. 1622-1627, Apr. 1991.

G. Singh and G. Krishnan. An isoperimetric formulation to predict deformation behavior of pneumatic fiber reinforced elastomeric actuators. In 2015 IEEE/RSJ International Conference on Intelligent Robots and Systems (IROS), pp. 1738-1743, Sep. 2015.

J. Bishop-Moser and S. Kota. Design and Modeling of Generalized Fiber-Reinforced Pneumatic Soft Actuators. IEEE Transactions on Robotics, 31(3):536-545, Jun. 2015.

D. Bruder, A. Sedal, R. Vasudevan, and C. D. Remy. Force generation by parallel combinations of fiber-reinforced fluid-driven actuators. IEEE Robotics and Automation Letters, 3(4):3999-4006, Oct 2018.

L. Paez, G. Agarwal, and J. Paik. Design and analysis of a soft pneumatic actuator with origami shell reinforcement. Soft Robotics, 3(3):109-119, 2016.

G. Agarwal, N. Besuchet, B. Audergon, and J. Paik. Stretchable Materials for Robust Soft Actuators towards Assistive Wearable Devices. Scientific Reports, 6(1):34224, 2016.

P. H. Nguyen, C. Sparks, S. G. Nuthi, N. M. Vale, and P. Polygerinos. Soft Poly-Limbs: Toward a New Paradigm of Mobile Manipulation for Daily Living Tasks. Soft Robotics, p. soro.2018.0065, 2018.

Fionnuala Connolly, Diana A. Wagner, Conor J. Walsh, and Katia Bertoldi. Sew-free anisotropic textile composites for rapid design and manufacturing of soft wearable robots. Extreme Mechanics Letters, 27:52-58, 2019.

Y. Fei, J. Wang, and W. Pang. A novel fabric-based versatile and stiffness-tunable soft gripper integrating soft pneumatic fingers and wrist. Soft Robotics, 2019.

G. Miron, B. Bdard, and J. S. Plante. Sleeved bending actuators for soft grippers: A durable solution for high force-to-weight applications. Actuators, 7(3), 2018.

Hye Jong Kim, Akihiro Kawamura, Yasutaka Nishioka, and Sadao Kawamura. Mechanical design and control of inflatable robotic arms for high positioning accuracy. Advanced Robotics, 32(2):89-104, 2018.

Elliot W Hawkes, Laura H Blumenschein, Joseph D Greer, and Allison M Okamura. A soft robot that navigates its environment through growth. Science Robotics, 2(8):1-8, 2017.

C. M. Best, M. T Gillespie, P. Hyatt, L. Rupert, V. Sherrod, and M. D Killpack. A New Soft Robot Control Method: Using Model Predictive Control for a Pneumatically Actuated Humanoid. IEEE Robotics & Automation Magazine, 23(3):75-84, 2016.

\* cited by examiner

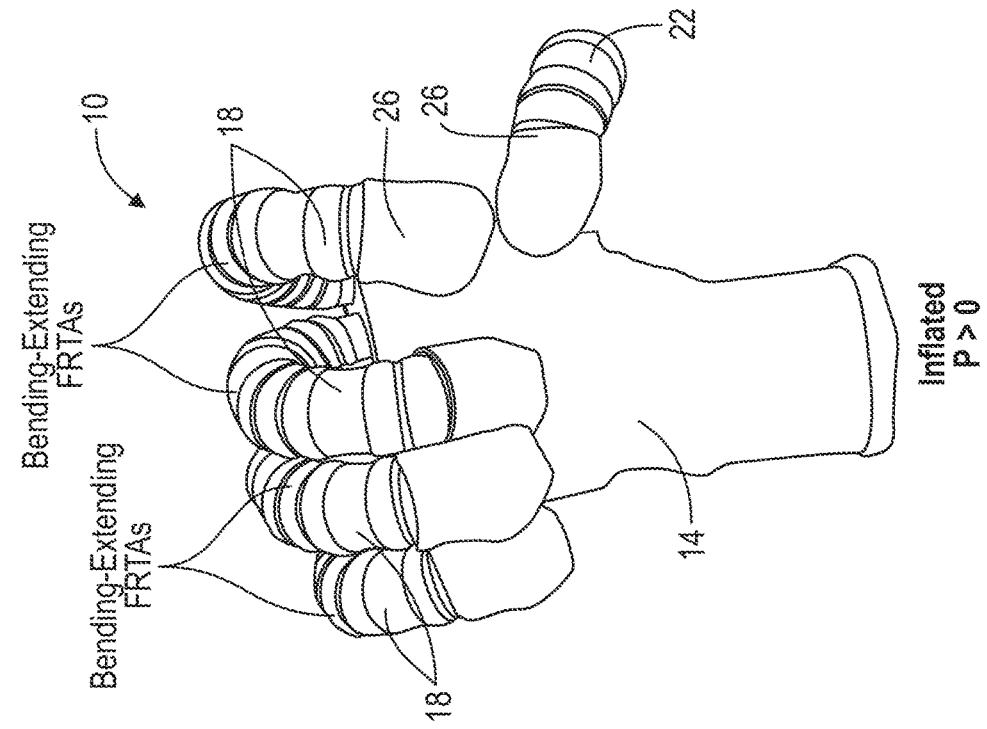
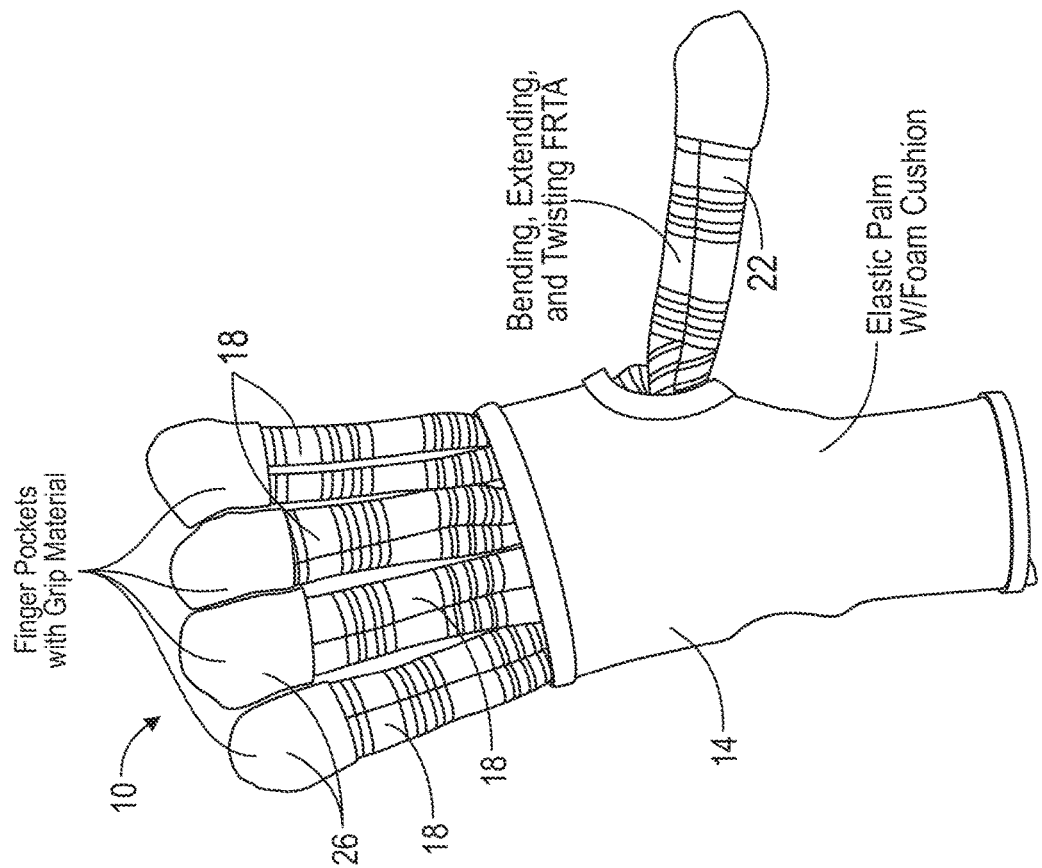
FIG. 1B
FIG. 1A

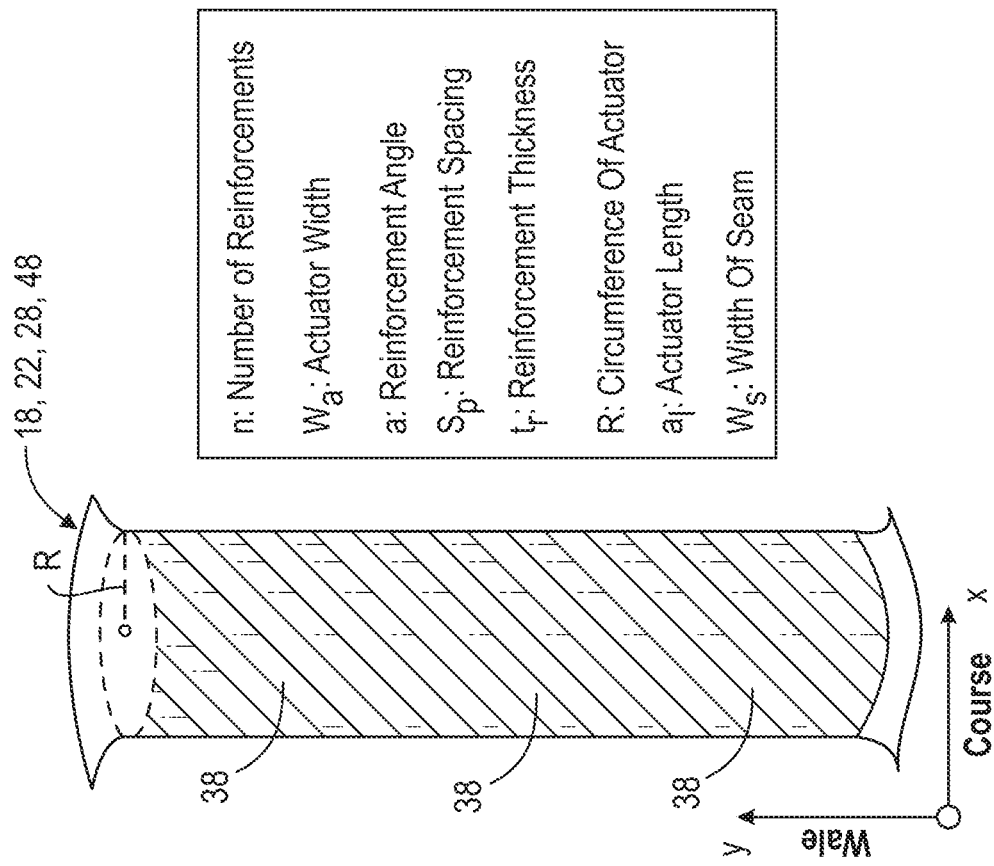
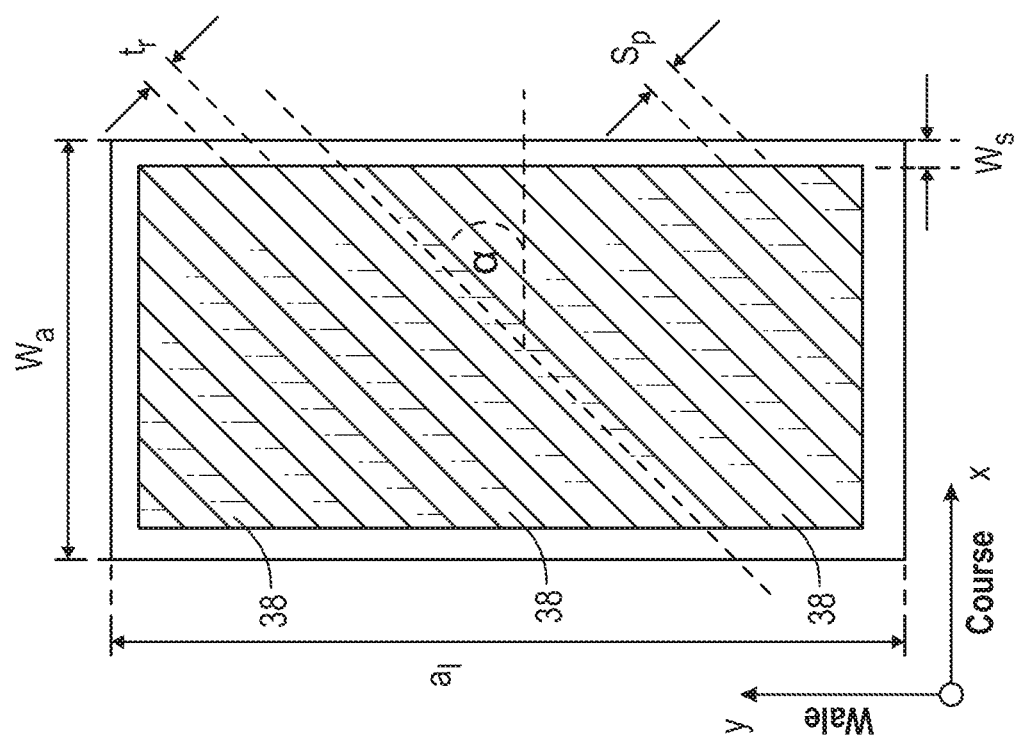
FIG. 4A
FIG. 4B and inflated position. The plurality of first fabric-reinforced textile actuators define a first range of motion. The second fabric-reinforced textile actuator is moveable between a collapsed position and an inflated position. The second fabric-reinforced textile actuator defines a second range of motion different than the first range of motion.

Other aspects of the disclosure will become apparent by consideration of the detailed description and accompanying drawings.

FABRIC-REINFORCED TEXTILE ACTUATORS

CROSS-REFERENCE TO RELATED APPLICATIONS

This application claims priority to U.S. Provisional Application No. 62/849,506, filed May 17, 2019, the entire contents of which are incorporated herein by reference.

STATEMENT REGARDING FEDERALLY SPONSORED RESEARCH OR DEVELOPMENT

This invention was made with government support under 1800940 awarded by the National Science Foundation. The government has certain rights in the invention.

FIELD

The present disclosure relates to an anthropomorphic soft robot hand made up of actuators, that is capable of holding objects of various sizes.

BACKGROUND

Soft pneumatic actuators (SPAs) are frequently used in soft robots in applications such as mobile and assistive devices. SPAs are generally lightweight, have a high power-to-weight ratio, are inexpensive to fabricate, are compliant, and can safely interact with a user as well as the surrounding environment. SPAs are often classified based on the materials used to fabricate them as well as the type of motion they can create. These motions can vary from bending, twisting, extending, contracting, or a combination of these.

SUMMARY

In one embodiment, a soft robot hand includes a palm, a first fabric-reinforced textile actuator coupled to the palm, and a second fabric-reinforced textile actuator coupled to the palm. The first actuator is moveable relative to the palm between a collapsed position and an inflated position to approximate a joint in a first human finger. The second actuator is spaced apart from the first actuator. The second actuator is also moveable relative to the palm between a collapsed position and an inflated position to approximate a joint in a second human finger.

In another embodiment, a soft robot hand includes a compliant palm, a first textile pneumatic actuator coupled to the palm, and a second textile pneumatic actuator coupled to the palm. The first textile pneumatic actuator includes a first segment configured to exhibit a first type of motion relative to the palm, and a second segment configured to exhibit a second type of motion relative to the palm. The first type of motion is different than the second type of motion. The second textile pneumatic actuator is spaced apart from the first textile pneumatic actuator. The second textile pneumatic actuator also includes a third segment configured to exhibit the first type of motion relative to the palm, and a fourth segment configured to exhibit the second type of motion relative to the palm.

In yet another embodiment, a soft robot hand includes a stretchable fingerless glove, a plurality of first fabric-reinforced textile actuators coupled to the fingerless glove, and a second fabric-reinforced textile actuator coupled to the fingerless glove. Each of the first fabric-reinforced textile actuators is moveable between a collapsed position and an

BRIEF DESCRIPTION OF THE DRAWINGS

FIG. 1A is a perspective view of a robot hand in a deflated position.

FIG. 1B is a perspective view of a robot hand in an inflated position.

FIG. 4A illustrates a fabric reinforcement.

FIG. 4B illustrates the fabric reinforcement of a fabric-reinforced textile actuator used with the robot hand of FIG. 1.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a textile-based soft pneumatic actuator that can be mechanically programmed to perform any combination of bending and twisting movements along its central axis.

Figures 2A, 2B:
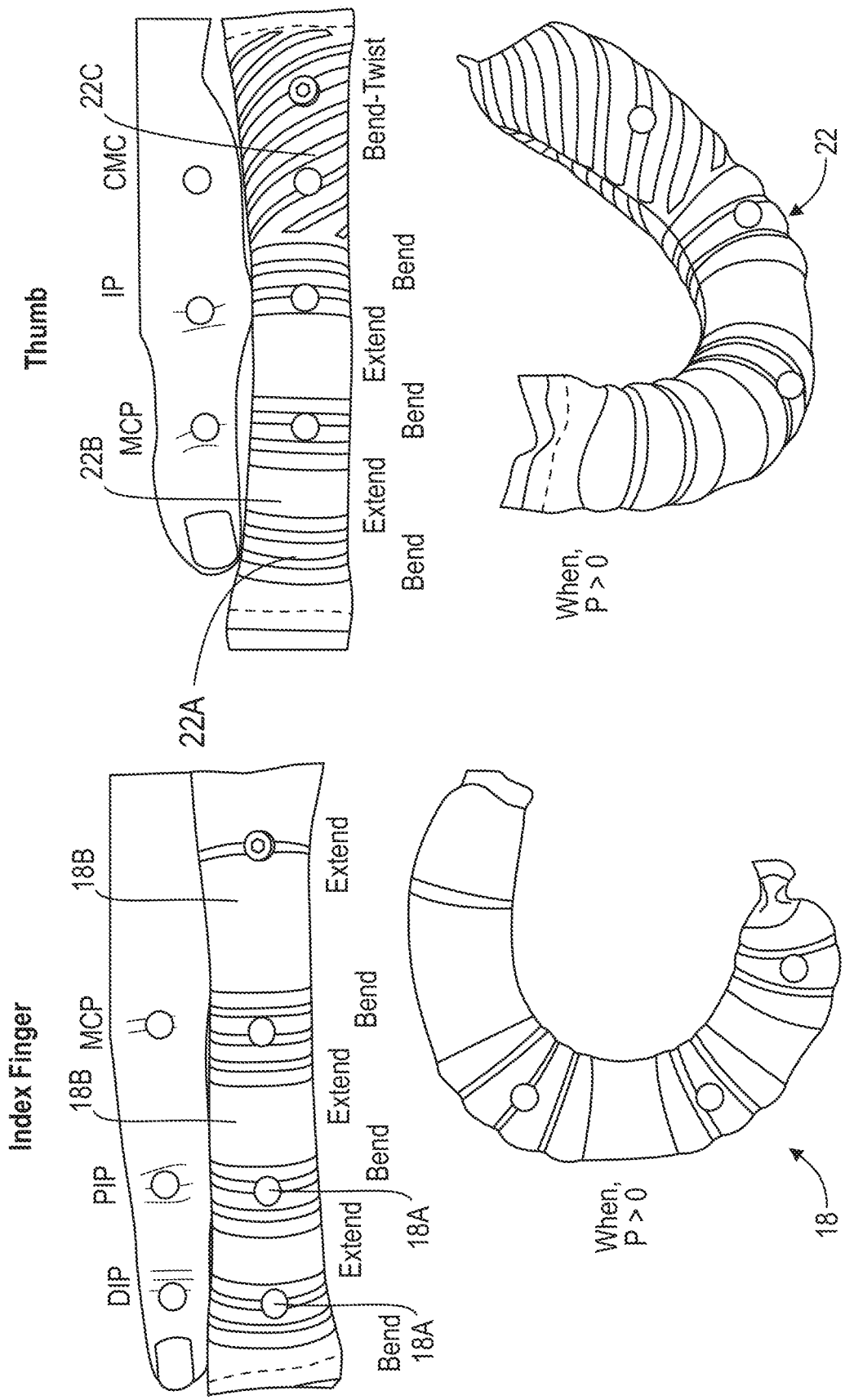
FIG. 2A is a multi-segmented fabric-reinforced textile actuator used with the robot hand of FIG. 1, approximating a human index finger.
FIG. 2B is a multi-segmented fabric-reinforced textile actuator used with the robot hand of FIG. 1, approximating a human thumb.

As shown in FIGS. 1A and 1B, an anthropomorphic soft robot hand 10 is designed for grasping applications, and is modeled off the motion capabilities of an index finger and a thumb of a biological human hand. The palm of the robot hand 10 includes a palm or stretchable fingerless glove 14. In the illustrated embodiment, foam is added to a center of the glove 14 to provide a soft and compliant structure. The robot hand 10 includes multiple textile-based soft pneumatic actuators or fabric-reinforced textile actuators (FRTAs) that are coupled to slots of the glove 14. The robot hand 10 includes at least one first, or index FRTA 18 and at least one second, or thumb FRTA 22. In the illustrated embodiment, the robot hand 10 includes four index FRTAs 18 and one thumb FRTA 22. Other embodiments can include different numbers and arrangements of index FRTAs 18 and thumb FRTAs 22 than that illustrated. As illustrated in FIGS. 1A and 2A, each FRTA 18, 22 can be capped with a fabric pocket 26 made for example of a stretch fabric layered with a grip material. The fabric pocket 26 increases a coefficient of friction of the FRTAs 18, 22.

As show in FIGS. 2A and 2B, the FRTAs 18, 22 are multi-segmented, and generate a combination of mechanical motions along a length of the FRTAs 18, 22. For example, with reference to FIG. 2A, the index FRTAs 18 exhibit a first range of motion to generally mimic the range of motion of an index finger, and include bending segments 18A and extending segments 18B. The bending segments 18A approximate the metacarpophalangeal (MCP), proximal interphalangeal (PIP), and distal interphalangeal (DIP) joints in a human hand. The extending segments 18B stretch the index FRTAs 18 over an object it is trying to grasp. With reference to FIG. 2B, the thumb FRTA 22 exhibits a second range of motion to generally mimic the motion of a thumb, and includes bending segments 22A, twisting segments 22B, and extending segments 22C. In some embodiments, the range of motion of the thumb FRTA 22 can be different than the range of motion of the index FRTA 18. For example, the bending segments 22A rotate about an axis orthogonal to the thumb FRTA 22, and the twisting segment 22B rotates about an axis along the thumb FRTA 22 (e.g., along a length of the FRTA 22). The extending segments 22C move along the axis about which the twisting segment 22B rotates. The bending and/or twisting motion of the thumb FRTA 22 approximates the motion seen at the carpometacarpal (CMC) joint of a human thumb. In the illustrated embodiment, the twisting segment 22B is also extendable.

Figure 3A:
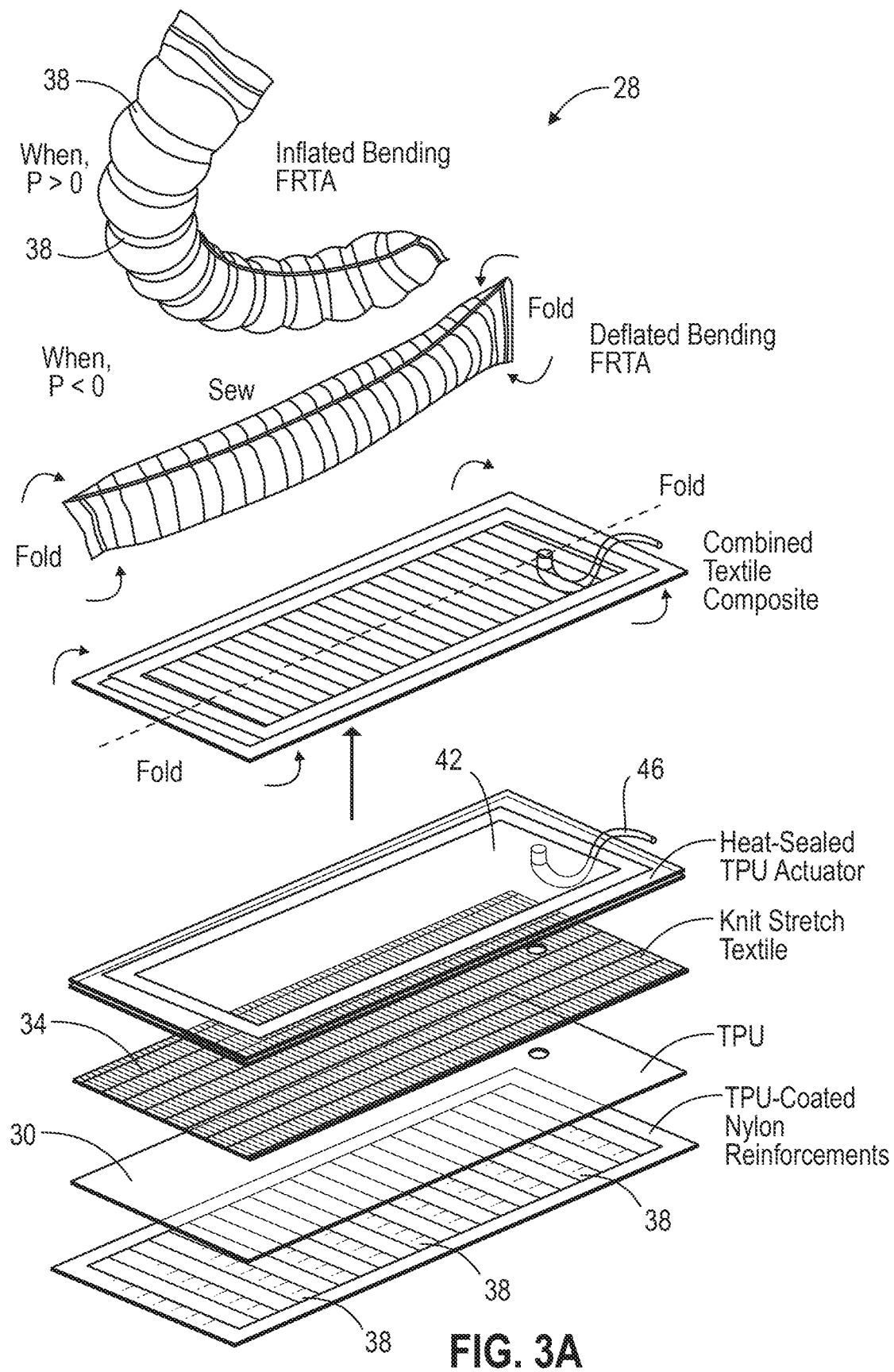
FIG. 3A illustrates fabrication of a bending fabric-reinforced textile actuator used with the robot hand of FIG. 1.
Figure 3B:
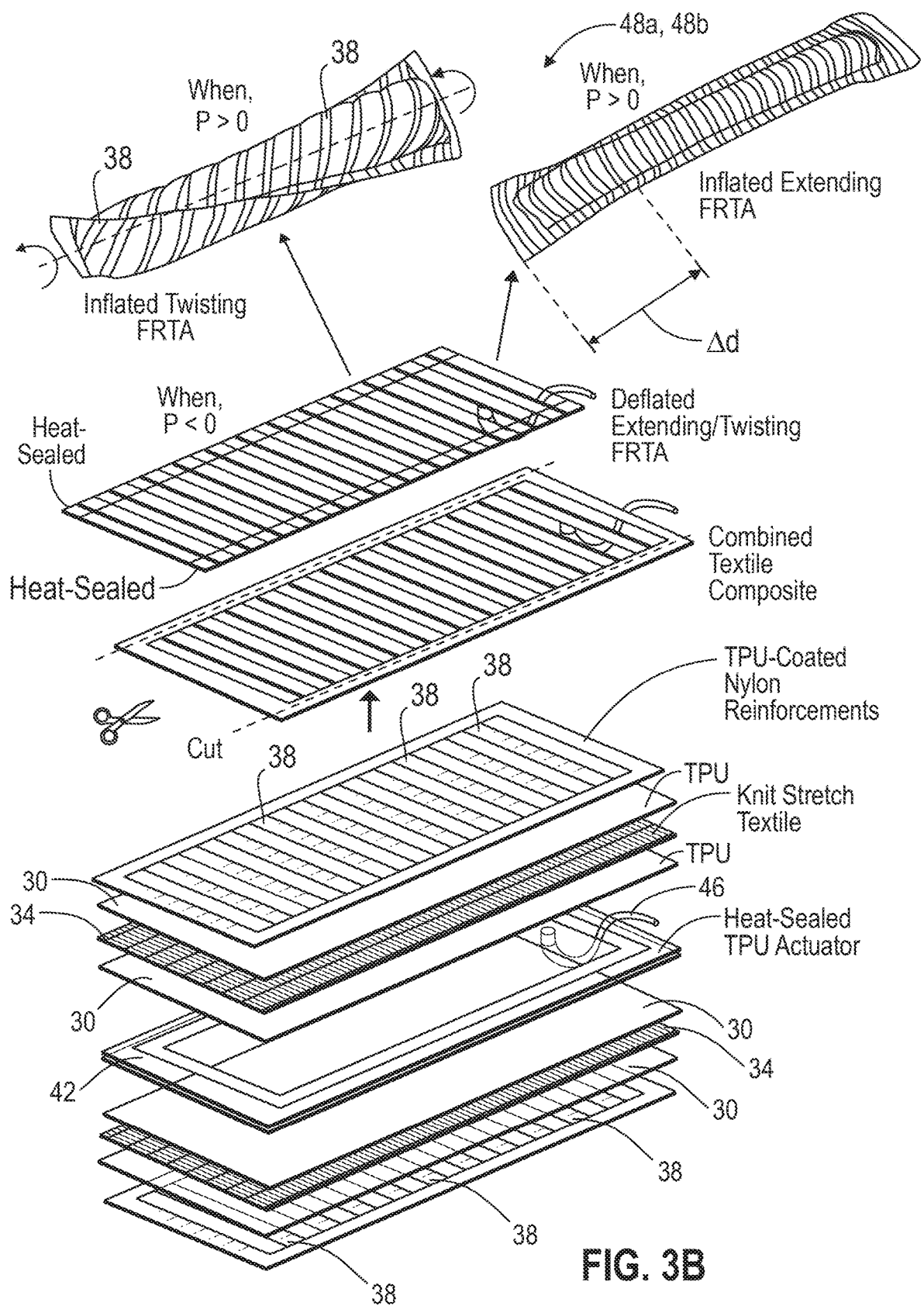
FIG. 3B illustrates fabrication of extending and twisting fabric-reinforced textile actuators used with the robot hand of FIG. 1.

As shown in FIGS. 3A and 3B, the FRTAs 18, 22 are made for example from a textile (e.g., a high-stretch knitted textile), a thermoplastic polyurethane (TPU) material, and a TPU coated material (e.g., a TPU-coated nylon fabric). In the illustrated embodiment, the high-stretch knitted textile is 83% 50 Denier Semi-Dull Nylon and 17% Denier Spandex fibers. In other embodiments, other compositions or types of materials may be used.

In the illustrated embodiment, the FRTAs 18, 22 are fabricated using knitted textiles that have different stretch and strain properties in bi-directions, due to their intrinsic anisotropy. The FRTAs 18, 22 are also lightweight (e.g., approximately 7 g) and allow full collapsibility when not activated (i.e., inflated). Fabric reinforcements (e.g., TPU-coated nylon fabric) also reduce local stresses and strains, minimizing surface damage due to abrasion or cutting seen in other SPAs (e.g., ones using Kevlar threads). The fabrication method to construct the FRTAs 18, 22 uses 2D manufacturing methods (e.g., sewing or laminating) to create 3D structures.

As shown in FIG. 3A, in some embodiments a bending FRTA 28 (which can be used for example as one of the index FRTAs 18 or the thumb FRTA 22 in the robot hand 10) can be formed using a TPU sheet 30 and a high-stretch knitted textile 34. The bending FRTA 28 rotates about an axis orthogonal to its longitudinal length. The TPU sheet 30 is laminated over (e.g., using a heat press) one side of the knitted textile 34 to create an adhesive side. The adhesive side is bonded (e.g., using a heat press) with a sheet of TPU-coated nylon fabric reinforcements 38. A TPU-actuator 42 is sealed to a side of the knitted textile 34 opposite the adhesive side. A pneumatic fitting 46 (e.g., a tube) is coupled to the TPU-actuator 42. The bending FRTA 28 is folded along a center and sewn to create a strain-limiting, inextensible centerline, which allows bending to occur. The bending FRTA 28 bends towards the inextensible side to create a bending motion when air is supplied through the pneumatic fitting 46.

As shown in FIG. 3B, in some embodiments a twisting or extending FRTA 48a, 48b (which can be used for example as one of the index FRTAs 18 or the thumb FRTA 22 in the robot hand 10) is formed using a TPU sheet 30 and a high-stretch knitted textile 34. The twisting FRTA 48a rotates about an axis along its length. The extending FRTA 48b translates along an axis along its length. Layers of TPU sheets 30 are laminated over both sides of a sheet of knitted textile 34. In the illustrated embodiment, the extending or twisting FRTA 48a, 48b includes two sheets of knitted textile 34, each laminated on both sides with TPU sheets 30. The external sides of the TPU sheets 30 are bonded with sets of TPU-coated nylon fabric reinforcements 38. A TPU actuator 42 is added in between the prepared sheets of knitted textile 34 with fabric reinforcements, to ensure air-impermeability. A pneumatic fitting 46 (e.g., a tube) is coupled to the TPU-actuator 42. The edges of the extending or twisting FRTA 48a, 48b are cut and heat sealed (e.g., using an impulse sealer). This allows the extending or twisting FRTA 48a, 48b to maintain its stretchability in order to twist and/or extend.

High-stretch knitted textiles 34 used in the FRTAs 18, 22, 28, 48 may have stretchability in two different directions that are referred to as wale (e.g., in the y-direction) and course (e.g., in the x-direction). As shown in FIG. 4A, the TPU-coated nylon fabric reinforcements 38 include an angle of the fabric reinforcements ($\alpha$) and the number of fabric reinforcements (n) that assist in providing stretchability. By $\alpha$, the actuators are able to perform one or a combination of motions including axial extension, radial expansion, or twisting about its axis. As shown in FIG. 4B, the relationship between the radius (R) of the FRTA 18, 22, 28, 48 with the TPU-coated nylon fabric reinforcement 38 to the width of the actuator ($w_a$), is as seen in Eq. (1) below.

$$R = \frac{(w_a - 2w_s)}{2\pi} \quad \text{Eq. (1)}$$

The number of fabric reinforcements (n), is related to the thickness of the reinforcements ($t_r$), which is modifiable in the case of fabric reinforcements, in comparison to the unmodifiable fiber reinforcements, and the length of the actuator (L) as seen in Eq.(2) below.

$$n = \frac{L\cos(\alpha)}{t_r + s_p} \quad \text{Eq. (2)}$$

Figure 5:
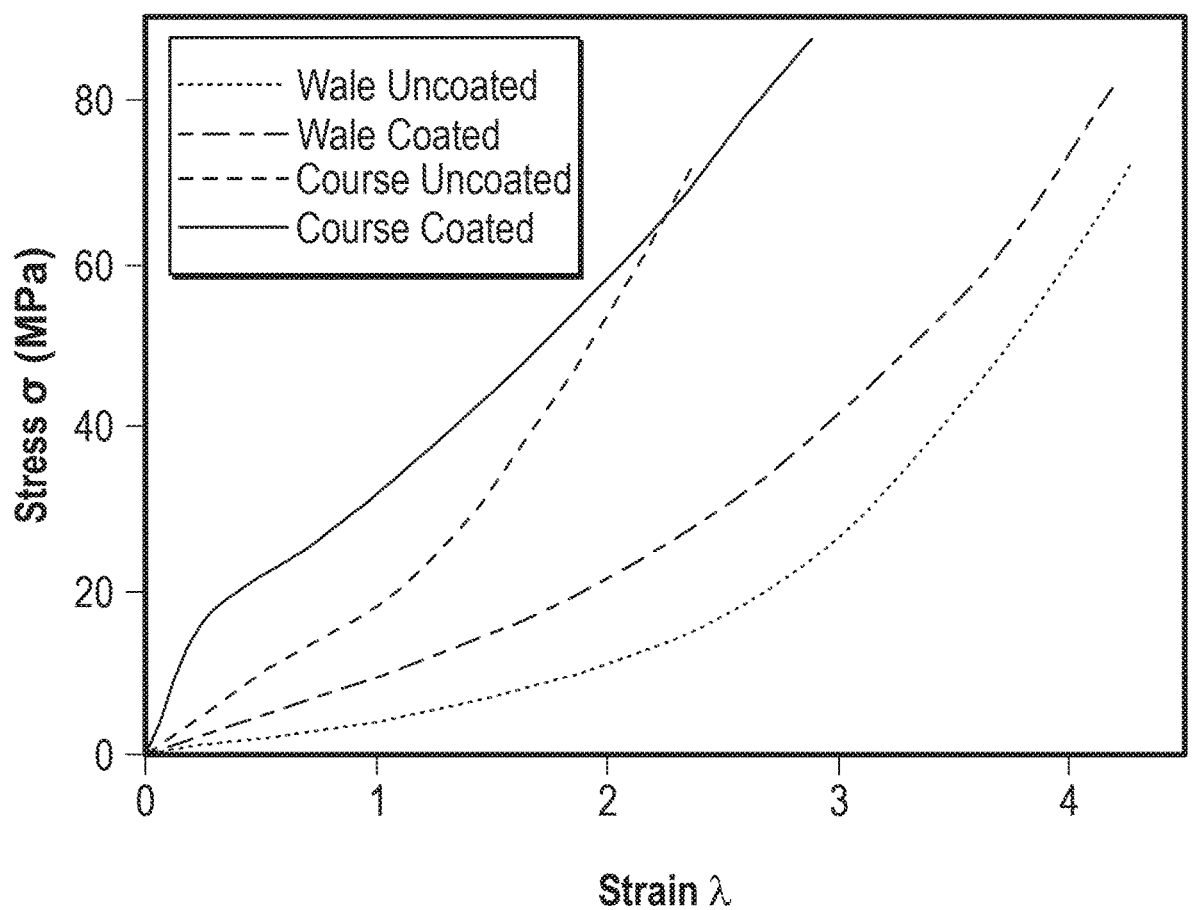
FIG. 5 illustrates stress-strain curves of a high-stretch textile used in fabric-reinforced textile actuators used with the robot hand of FIG. 1.
Figure 6A:
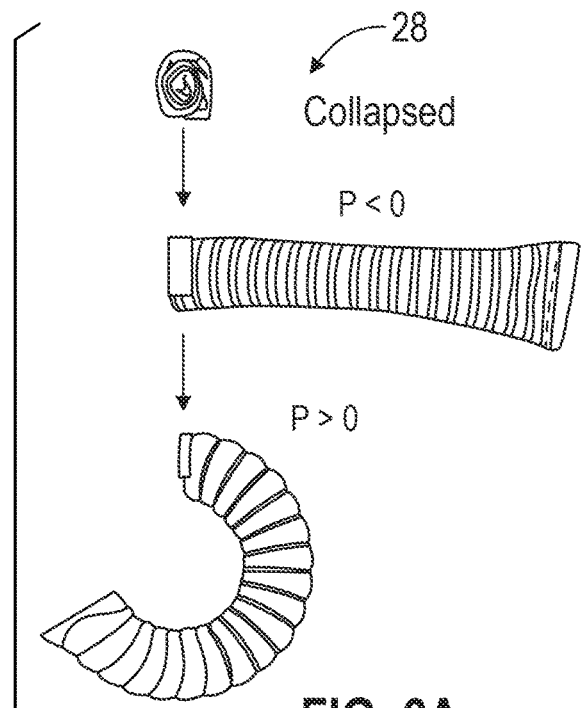
FIG. 6A illustrates a bending fabric-reinforced textile actuator used with the robot hand of FIG. 1, in a collapsed and inflated state.
Figure 6B:
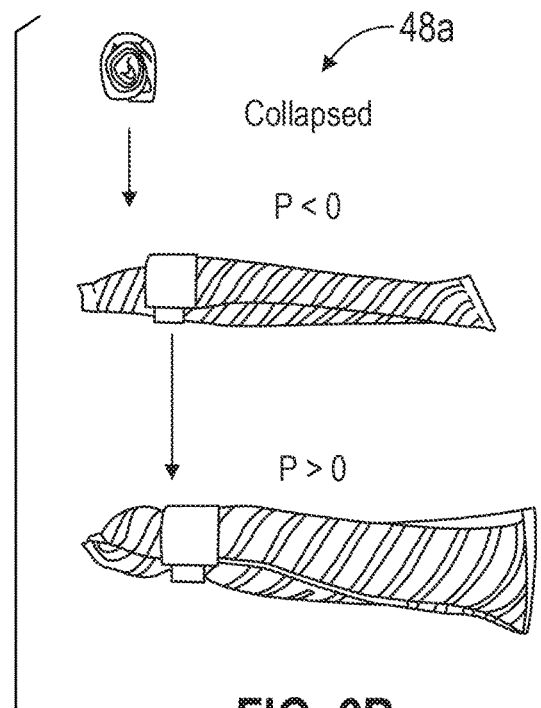
FIG. 6B illustrates a twisting fabric-reinforced textile actuator used with the robot hand of FIG. 1, in a collapsed and inflated state.
Figure 6C:
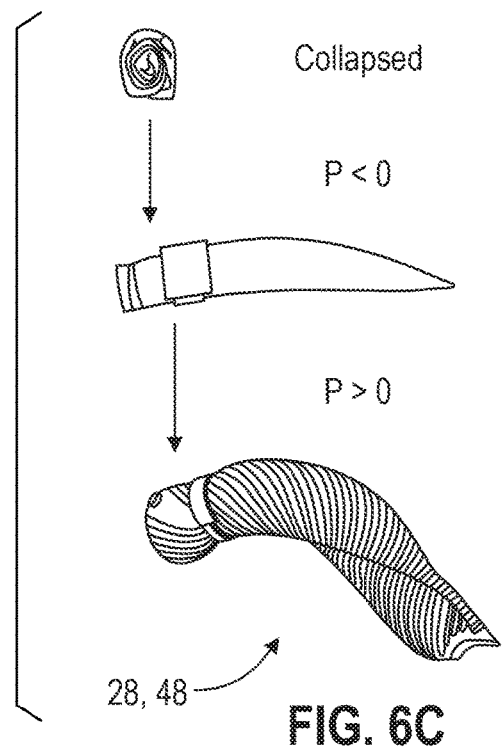
FIG. 6C illustrates a bending-twisting fabric-reinforced textile actuator used with the robot hand of FIG. 1, in a collapsed and inflated state.
Figure 6D:
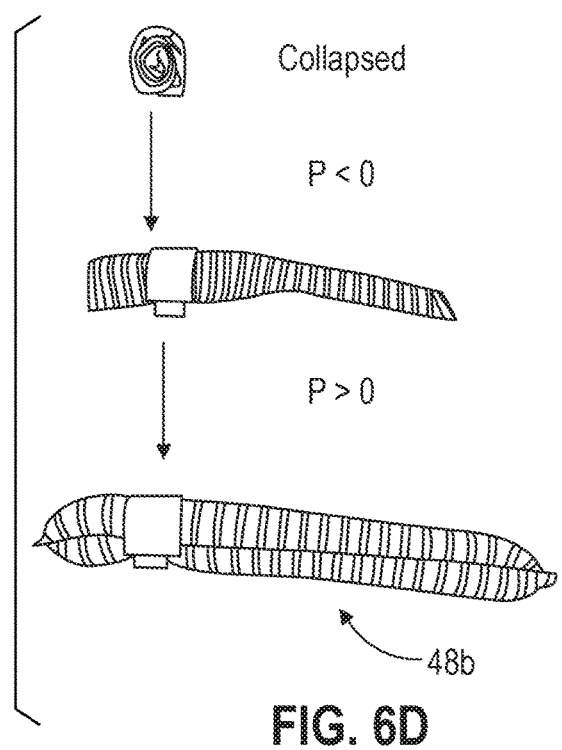
FIG. 6D illustrates an extending fabric-reinforced textile actuator used with the robot hand of FIG. 1, in a collapsed and inflated state.

As shown in FIG. 5, the FRTAs 18, 22, 28, 48 were tested (e.g., using a universal testing machine) in both the wale and course directions. The course direction (e.g., orthogonal to the direction of manufacturing) was stiffer than the wale direction (e.g., parallel to the direction of manufacturing). In the illustrated embodiment, the knit had a higher stretch of 426.8% at 72.41 MPa in the wale direction. The knit was stiffer at 240.1% at 73.14 MPa in the course direction. The TPU-laminated textile material 30, 34 showed an increase of an overall stiffness in both directions but still preserves of the mechanical anisotropic properties of the knitted textile material at 422.9% at 83.78 MPa (in the wale direction) and 240.1% at 71.01 MPa (in the course direction).

As shown in FIGS. 6A-6D, the FRTAs 28, 48 are movable between a first or collapsed state and a second or inflated state. In the collapsed state, the respective FRTA 28, 48 is deflated, and an internal pressure within the FRTA 28, 48 is less than zero (i.e., P<0). In the inflated state, air is supplied to the FRTAs 28, 48 via the pneumatic fitting 46. The internal pressure of the FRTA 28, 48 becomes greater than zero (i.e., P>0) and the FRTA 28, 48 expands. The FRTA 28, 48 exhibits a first type of motion (e.g., bending), a second type of motion (e.g., twisting), and/or a third type of motion (e.g., extending) while transitioning between the collapsed and inflated states. In the illustrated embodiment, the FRTA 48 may collapse 13% of its length in the collapsed position as compared to the inflated position, although other embodiments include various other values and ranges (e.g., between 10% and 20%, between 5% and 25%, etc.).

Figure 7:
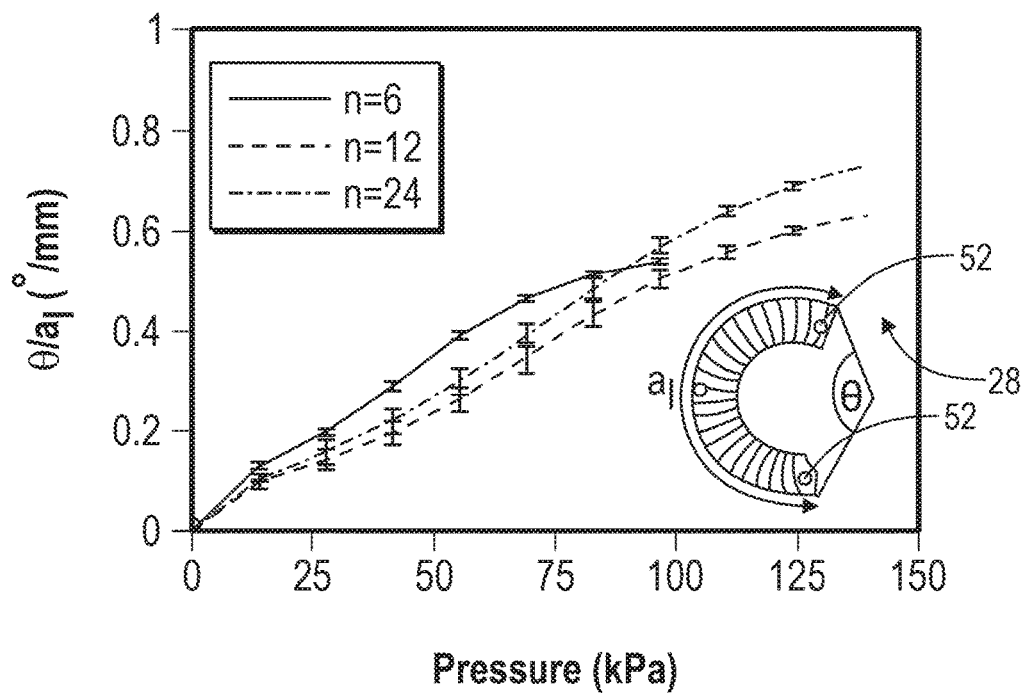
FIG. 7 illustrates a curvature angle per unit length for various numbers of fabric reinforcements n, where $\theta$ is the curvature angle and $a_l$ is the curvature length of the actuator used with the robot hand of FIG. 1, and where markers are signified by dots.

As shown in FIG. 7, bending performance was studied while varying the number of reinforcements (n=6, 12, 24). Three motion capture markers 52 were added at the tip, mid-point, and base of each FRTA 28, respectively, to calculate a curvature angle θ of the FRTA 28. The curvature length $a_l$ was also monitored, and the curvature angle per unit length ($\theta/a_l$) was calculated at each pressure interval. The FRTA 28 was inflated up to 37.9 kPa at increments of 13.8 kPa. The bending curvatures ($\theta/a_l$) at the maximum tested pressure were 0.63°/mm and 0.73°/mm for n=12 and 24, respectively. The actuator with n=6 showed uncontrolled radial expansion after the input pressure of 100 kPa, leading to failure. It was also noticed that the bending curvature trend was very similar for the tested numbers of reinforcements.

Figure 8:
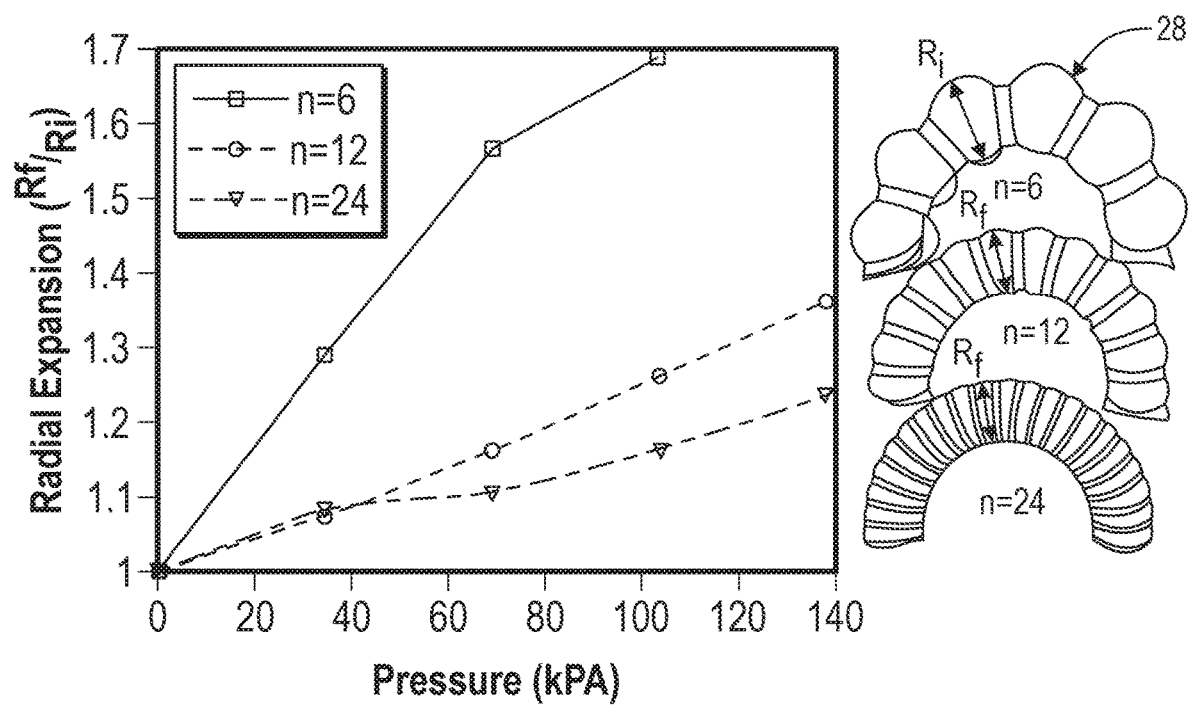
FIG. 8 illustrates radial expansion of bending fabric-reinforced textile actuators used with the robot hand of FIG. 1 for varying numbers of reinforcements, where $R_f$ is a final inflated radius of the actuator and $R_i$ is an initial radius of the actuator.

As shown in FIG. 8, the difference between the performance of the bending FRTA 28 with the different reinforcement numbers was monitored with radial expansion. The radial expansion was monitored using a final radius ($R_f$) over initial radius ($R_i$). The FRTA 28 with the least number of reinforcements (e.g., n=6) showed a radial expansion of up to 70% at 100 kPa and the FRTA 28 with the largest number of reinforcements (e.g., n=24) showed just an increase of 24% at a higher pressure of 137.9 kPa. Therefore, the more the reinforcements the larger the pressures the actuators were able to withstand, as well as the less the radial expansion, even though the bending performance was similar.

Figure 9:
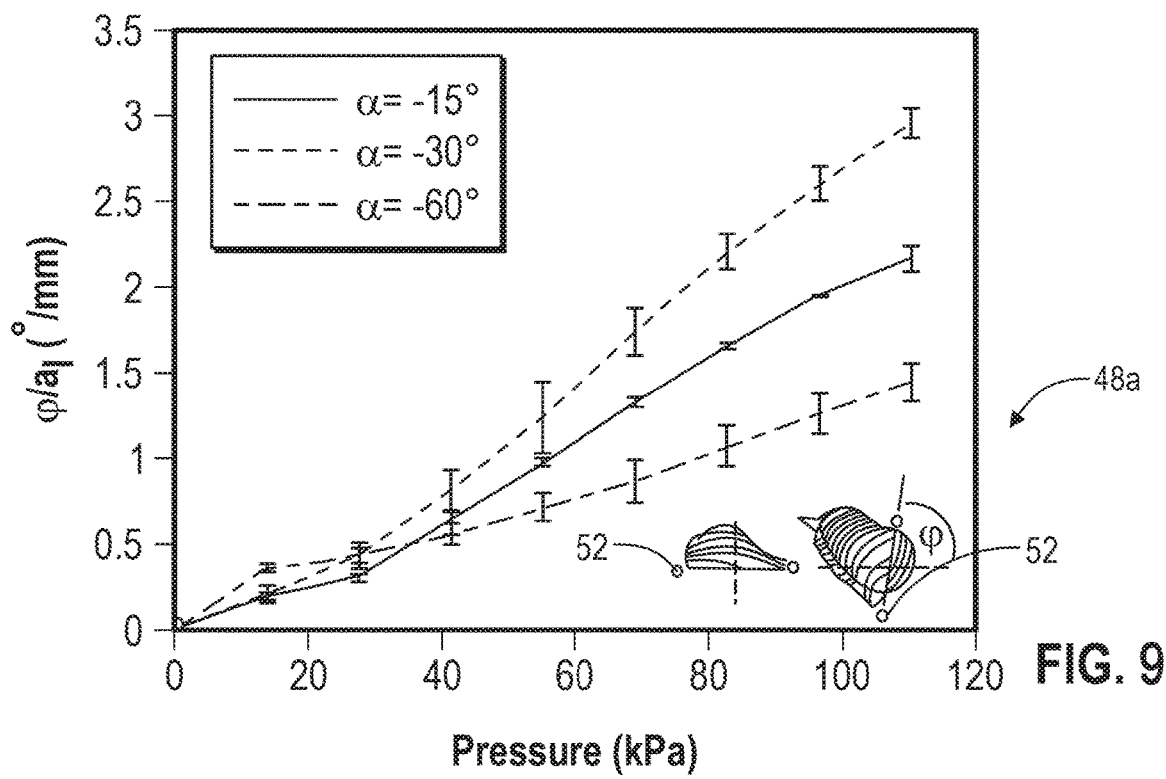
FIG. 9 illustrates twisting capabilities of a fabric-reinforced textile actuator used with the robot hand of FIG. 1 for a varying angle $\phi$, where markers are signified by dots.

As shown in FIG. 9, twisting capabilities of the FRTA 48a were studied based on a fabric reinforcement angle (α=−15°, −30°, −60°). Two motion capture markers 52 were added along a width of the FRTA 48a, and at the tip and base of the FRTA 48a. A twisting angle φ per unit length $a_l$ was monitored. The negative a meant that the FRTA 48a was twisting in a counterclockwise manner. In this test, the FRTA 48a was inflated up to 110.316 kPa in intervals of 13.789 kPa. The FRTAs 48a with α=−15°, −30°, −60°, were able to twist up to 2.157°/mm, 1.44°/mm, and 2.951°/mm, respectively. This correlated to the FRTAs 48a (α=−15°, −30°, 60°) twisting along their center axis up to 64.7°, 43.2°, and 87° at 110.316 kPa. The least radial expansion observed for the twisting FRTAs 48a was observed for α=−15° expanding 27.6% of its initial radius while the most prominent change in radius was achieved by α=−60° reaching a radial expansion of 45.6%. As it can be observed, not only was the twist affected by direction of the reinforcements but also the radial strain of the fiber. Therefore, the increase in a did not necessarily mean that the actuator would be able to twist better. Thus, the increase in twisting angle increased the radial expansion on the actuator as well.

Figure 10:
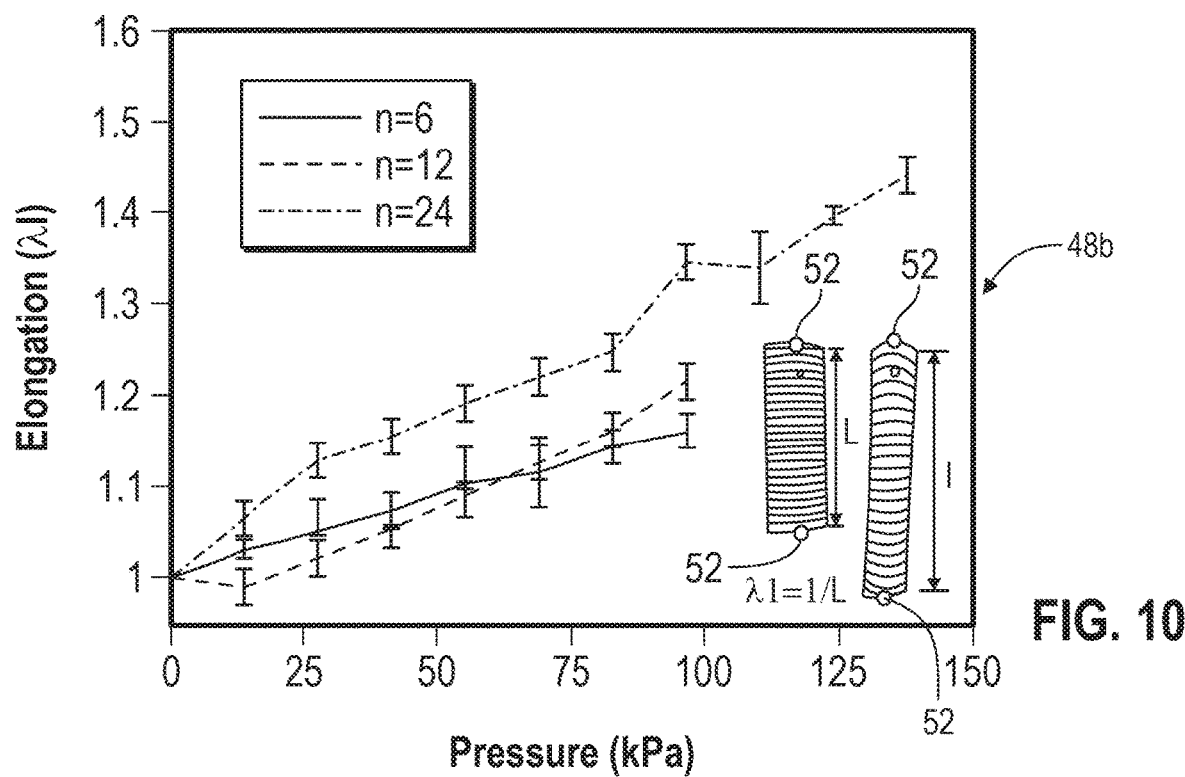
FIG. 10 illustrates extension capabilities $\lambda_4$ of fabric-reinforced textile actuators used with the robot hand of FIG. 1 for varying numbers of reinforcements n, where markers are signified by dots.
Figure 11A:
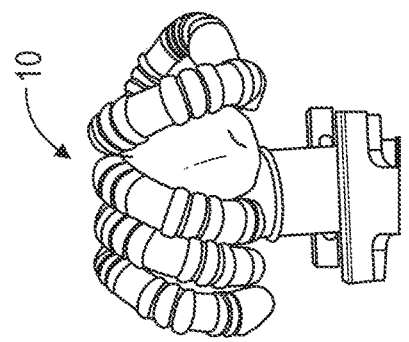
FIGS. 11A-11F illustrate the robot hand of FIG. 1 grasping a variety of objects.
Figure 11C:
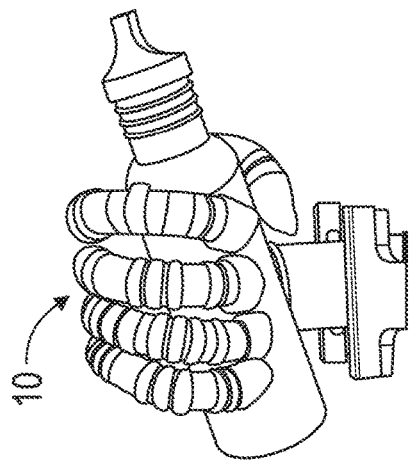
Figure 11B:
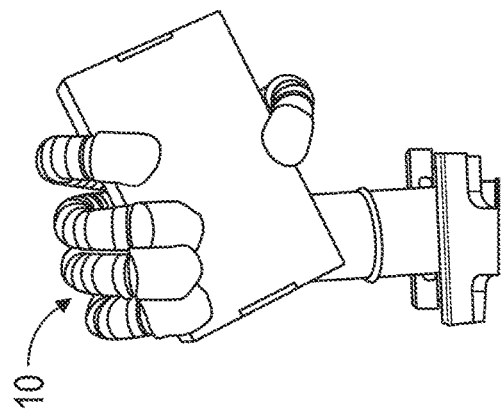
Figure 11D:
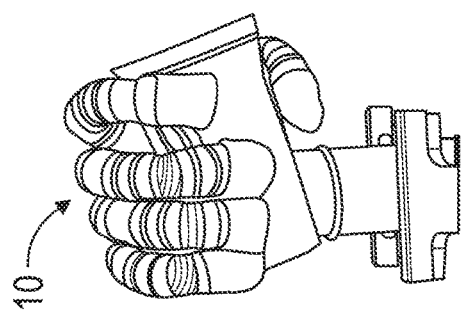
Figure 11E:
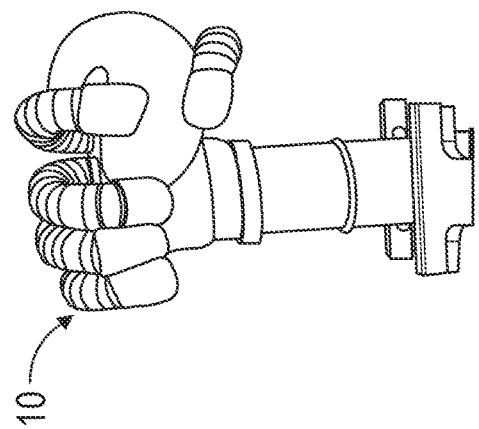
Figure 11F:
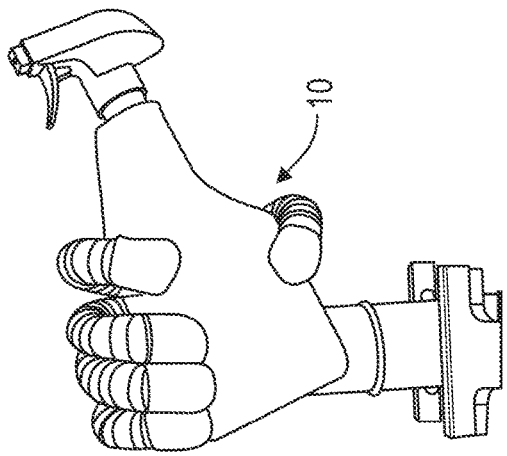

As shown in FIG. 10, extending FRTAs 48b were tested up to 137.9 kPa at increments of 13.8 kPa to test the effects of the change in the number of reinforcement (n=6, 12, 24) on the effects of bending. Motion capture markers 52 were placed on the tip and base of the FRTAs 48b, and an extension or elongation ($\lambda_l$) was monitored. The FRTAs 48b with n=6 and 12 each failed after 100 kPa. These FRTAs 48b were able to stretch up to $\lambda_f$=1.16 and 1.22 respectively. For the FRTA 48b with the most reinforcements (e.g., n=24), the maximum extension achieved was $\lambda_f$=1.44 times more than its initial length. The trend for radial expansion followed a similar trend to the bending FRTAs 28, decreasing as the number of reinforcements increases. The results indicate that the FRTAs 48b with n=6 and 12 perform similarly.

Since the radial expansion was prominent in the extending FRTAs 48b, axial extension was affected and early failure was noticed. The radial expansion increase at 100 kPa for n=6 and 12 was 87.4% and 30.5% respectively. To convert further convert radial expansion to axial extension, the number of reinforcements can be higher, as with the actuators with n=24, where the radial expansion was 27.1% larger at a higher pressure of 137.4 kPa.

The output of the robot hand 10 can be measured, for example, by varying the pressure up to 172 kPa at intervals of 34.5 kPa. The index FRTAs 18 and the thumb FRTA 22 are capable of producing 54.8±2.36N and 25.1±1.13N, respectively. As shown in FIG. 11, in the illustrated embodiment the robot hand 10 can grasp a variety of objects that have different weights, sizes, and textures. For example, objects may include: an apple (168.5 g), a box (134 g), a metal bottle (165 g), a cup (50.3 g), a seashell (94.1 g), cleaning bottle (93 g). In the illustrated embodiment, the FRTAs 18, 22 of the soft robot hand 10 were inflated up to a maximum of 172 kPa to achieve an appropriate gripping force. In other embodiments, a higher or lower maximum pressure may be necessary to achieve the appropriate gripping force. Other objects may also be grasped by the hand.

Although aspects have been described in detail with reference to certain preferred embodiments, variations and modifications exist within the scope of one or more independent aspects as described.

What is claimed is:

1. A soft robot hand comprising:
a palm;
a first fabric-reinforced textile actuator having an axis extending along a length of the first fabric-reinforced textile actuator, wherein the first fabric-reinforced textile actuator is coupled to the palm and moveable relative to the palm between a collapsed position and an inflated position to approximate a first joint in a first human finger, wherein the first fabric-reinforced textile actuator has a plurality of fabric reinforcements that each extend at an oblique angle relative to the axis; and
a second fabric-reinforced textile actuator coupled to the palm and spaced apart from the first fabric-reinforced textile actuator, the second fabric-reinforced textile actuator moveable relative to the palm between a collapsed position and an inflated position to approximate a second joint in a second human finger.

2. The soft robot hand of claim 1, wherein the first fabric-reinforced textile actuator comprises a thermoplastic polyurethane material and a high-stretch knitted textile.

3. The soft robot hand of claim 2, wherein the plurality of fabric reinforcements are thermoplastic polyurethane-coated nylon fabric reinforcements that are bonded to the high-stretch knitted textile.

4. The soft robot hand of claim 2, wherein the first fabric-reinforced textile actuator has a thermoplastic polyurethane actuator sealed to a side of the high-stretch knitted textile.

5. The soft robot hand of claim 1, wherein in the collapsed position, the first fabric-reinforced textile actuator is deflated and has an internal pressure of less than zero.

6. The soft robot hand of claim 1, further comprising a pneumatic fitting configured to supply air to at least one of the first fabric-reinforced textile actuator and the second fabric-reinforced textile actuator.

7. The soft robot hand of claim 1, wherein the first fabric-reinforced textile actuator is capped with a fabric pocket having a grip material.

8. The soft robot hand of claim 1, wherein the first fabric-reinforced textile actuator exhibits at least one of a bending motion, a twisting motion, and an extending motion while transitioning between the collapsed position and the inflated position.

9. A soft robot hand comprising:
a compliant palm;
a first textile pneumatic actuator coupled to the compliant palm, the first textile pneumatic actuator including a first segment configured to exhibit a first motion relative to the compliant palm, and a second segment configured to exhibit a second motion relative to the compliant palm, the first motion being different than the second motion; and
a second textile pneumatic actuator coupled to the compliant palm and spaced apart from the first textile pneumatic actuator, the second textile pneumatic actuator including a third segment configured to exhibit the first motion relative to the compliant palm, and a fourth segment configured to exhibit the second motion relative to the compliant palm;
wherein the second textile pneumatic actuator has a fifth segment configured to exhibit a third motion relative to the compliant palm, the third motion being different than the first motion and the second motion, wherein the first motion is bending, the second motion is extending, and the third motion is twisting.

10. The soft robot hand of claim 9, wherein the third segment is configured to rotate about an axis orthogonal to the second textile pneumatic actuator.

11. The soft robot hand of claim 9, wherein the fourth segment is configured to move along an axis that extends along a length of the second textile pneumatic actuator.

12. The soft robot hand of claim 9, wherein the fifth segment is configured to rotate about an axis along a length of the second textile pneumatic actuator.

13. A soft robot hand comprising:
a stretchable fingerless glove;
a plurality of first fabric-reinforced textile actuators coupled to the fingerless glove, wherein each of the first fabric-reinforced textile actuators is moveable between a collapsed position and an inflated position, wherein the plurality of first fabric-reinforced textile actuators defines a first range of motion; and
a second fabric-reinforced textile actuator coupled to the fingerless glove, wherein the second fabric-reinforced textile actuator is moveable between a collapsed position and an inflated position, wherein the second fabric-reinforced textile actuator defines a second range of motion different than the first range of motion;
wherein the second fabric-reinforced textile actuator includes bending segments, twisting segments, and extending segments.

14. The soft robot hand of claim 13, wherein the first range of motion is configured to mimic a range of motion of an index finger.

15. The soft robot hand of claim 13, wherein the plurality of first fabric-reinforced textile actuators include bending segments and extending segments.

16. The soft robot hand of claim 13, wherein the second range of motion is configured to mimic a range of motion of a thumb.

17. The soft robot hand of claim 13, wherein in the collapsed position at least one of the plurality of first fabric-reinforced textile actuators and the second fabric-reinforced textile actuator is configured to collapse between 5% and 25% of a length of the inflated position.

* * * * *